United States Patent
Ylikoski (10) Patent No.: US 7,680,258 B2
(45) Date of Patent: Mar. 16, 2010

(54) PROVIDING INFORMATION IN A COMMUNICATION SYSTEM

(75) Inventor: Martti Ylikoski, Helsinki (FI)

(73) Assignee: Nokia Corporation, Espoo (FI)

( * ) Notice: Subject to any disclaimer, the term of this patent is extended or adjusted under 35 U.S.C. 154(b) by 1590 days.

(21) Appl. No.: 10/924,899

(22) Filed: Aug. 25, 2004

(65) Prior Publication Data

US 2005/0271191 A1 Dec. 8, 2005

(30) Foreign Application Priority Data

Jun. 7, 2004 (FI) .................................. 20040781

(51) Int. Cl.
*H04M 15/00* (2006.01)
(52) U.S. Cl. ............................ 379/121.01; 379/114.01; 379/122; 455/405; 455/408
(58) Field of Classification Search ............ 379/114.01, 379/114.03, 114.2, 115.01, 116, 118, 120, 379/121.01, 122, 127.01, 130; 455/405, 455/406, 408
See application file for complete search history.

(56) References Cited

U.S. PATENT DOCUMENTS

| | | | | |
|---|---|---|---|---|
| 6,084,953 A | * | 7/2000 | Bardenheuer et al. | 379/114.01 |
| 6,181,785 B1 | * | 1/2001 | Adams et al. | 379/114.01 |
| 6,195,543 B1 | * | 2/2001 | Granberg | 455/407 |
| 6,212,506 B1 | * | 4/2001 | Shah et al. | 705/418 |
| 6,442,260 B1 | * | 8/2002 | Simonen | 379/130 |
| 6,493,547 B1 | * | 12/2002 | Raith | 455/405 |
| 6,865,262 B1 | * | 3/2005 | Mitts et al. | 379/114.02 |
| 6,980,794 B1 | * | 12/2005 | Hamada et al. | 455/407 |
| 7,113,772 B2 | * | 9/2006 | Chmaytelli et al. | 455/414.1 |
| 7,146,154 B1 | * | 12/2006 | Park | 455/406 |
| 7,167,699 B1 | * | 1/2007 | Kretsinger | 455/405 |
| 7,203,478 B2 | * | 4/2007 | Benco et al. | 455/406 |
| 7,222,293 B1 | * | 5/2007 | Zapiec et al. | 715/205 |
| 7,224,974 B2 | * | 5/2007 | Benco et al. | 455/445 |
| 2005/0014483 A1 | * | 1/2005 | Lagerstrom | 455/405 |
| 2006/0014519 A1 | * | 1/2006 | Marsh et al. | 455/406 |
| 2007/0202846 A1 | * | 8/2007 | Marsh et al. | 455/408 |
| 2008/0119163 A1 | * | 5/2008 | Marsh et al. | 455/408 |

FOREIGN PATENT DOCUMENTS

EP 0 905 961 A2 3/1999

(Continued)

OTHER PUBLICATIONS

European Office Action for European patent application No. 05732594.6 dated Aug. 16, 2007.

(Continued)

*Primary Examiner*—Binh K Tieu
(74) *Attorney, Agent, or Firm*—Alston & Bird LLP (57) ABSTRACT

The present invention relates to a method for providing user equipment information associated with use of services provided via a communication system. The method comprises a step of collecting, in a network element, use information relating to use, by the user equipment during a period, of a service provided via the communication system. The method comprises a further step of loading, by the network element, the use information on the user equipment according to a predetermined plan. An information provision entity, user equipment and a communication system are configured to execute the method.

24 Claims, 6 Drawing Sheets

FOREIGN PATENT DOCUMENTS

| | | |
|---|---|---|
| KR | 2001-1199 | 1/2001 |
| WO | WO 99/08436 | 2/1999 |
| WO | WO 99/08439 | 2/1999 |
| WO | WO 99/33253 | 7/1999 |
| WO | WO 02/03674 A2 | 1/2002 |
| WO | WO 2004/093424 A1 | 10/2004 |

OTHER PUBLICATIONS

Korean Office Action, Nov. 29, 2008.

* cited by examiner

PROVIDING INFORMATION IN A COMMUNICATION SYSTEM

FIELD OF THE INVENTION

The invention relates to communication systems, and more particularly to providing user equipment information associated with use of services provided via the communication systems.

BACKGROUND OF THE INVENTION

A communication system can be seen as a facility that enables communication sessions between two or more entities such as user terminal and/or other nodes associated with the communication system. Subscribers, such as the users or end-users, to a communication system may be offered and provided numerous services, such as two-way or multi-way calls, data communication or multimedia services or simply an access to a network, such as the Internet. The services may be offered by an operator of the communication system or by an external service provider.

Examples of communication systems may include fixed line communication systems, such as a public switched telephone network (PSTN), wireless communication systems, e.g. general packet radio service (GPRS), universal mobile telecommunications system (UMTS), wireless local area network (WLAN) and so on, and/or other communication networks, such as an Internet Protocol (IP) network and/or other packet switched data networks. Various communication systems may simultaneously be concerned in a connection. An end-user may access a communication network by means of any appropriate user equipment (UE), for example a mobile terminal, such as a mobile station (MS), a cellular phone, a personal digital assistant (PDA) or the like, or other terminals, such as a personal computer (PC), or any other equipment operable according to a suitable network protocol, such as a wireless applications protocol (WAP) or a hypertext transfer protocol (HTTP). The user equipment may support, in addition to call and network access functions, other services, such as short message service (SMS), multimedia message service (MMS), electronic mail (email), Web service interface (WSI) messaging and voice mail.

A subscriber may have a prepaid account storing payment resources for using services. A certain amount of payment resources may be placed in advance in the prepaid account of the subscriber and an appropriate network element may distribute the resources to the entities requiring prepayment and control balance of the prepaid account.

Services may be charged in different ways depending on the type of the service and service providers, for example. Therefore, a subscriber may not be aware of final costs of using services. The final costs may work out more expensive than the subscriber expected. The subscriber may become reluctant or unwilling to use the services if estimating the final costs is difficult or if the subscriber gets information on the costs with a long delay. In particular, this may cause problems when prepaid accounts are used. The subscriber may not easily know how much payment resources there are left in the prepaid account, especially if the subscriber does not know what shall be charged for the used service. This may lead to reduction in use of all services, even if high charging may relate only to certain services.

In some communication systems, a warning message or similar may be displayed before a connection is established for a subscriber to a requested content service. This may slow down connecting to a service. It may be possible to avoid partly this slowing effect by defining a charging limit below of which a connection may be allowed without the warning message.

In intelligent networks (IN), the network may inform the subscriber before subscriber's prepaid account runs out of payment resources. The network may send information to the subscriber in a voice mail or an SMS or a similar message.

There is a need for improved solutions of providing user equipment information associated with services provided via a communication system.

It shall be appreciated that these issues are not limited to any particular communication environment, but may occur in any appropriate communication system.

SUMMARY OF THE INVENTION

Embodiments of the invention aim to address one or several of the above problems or issues.

In accordance with an aspect of the invention, there is provided a method for providing user equipment information associated with use of services provided via a communication system. The method comprises a step of collecting, in a network element, use information relating to use, by the user equipment during a period, of a service provided via the communication system. The method comprises a further step of loading, by the network element, the use information on the user equipment according to a predetermined plan.

In accordance with another aspect of the invention, there is provided an information provision entity configured to collect use information for a predefined period relating to the use, by a user equipment, of a service provided via the communication system and to load the use information on the user equipment according to a predetermined plan.

In accordance with another aspect of the invention, there is provided user equipment configured to use services provided via a communication system and to receive use information loaded by the network element.

In accordance with another aspect of the invention, there is provided a communication system configured to provide a service to user equipment via the communication system, to collect use information relating to use of the service by the user equipment during a period and to load the use information on the user equipment according to a predetermined plan.

The use information may be collected by detecting by the network element the start and the end of the use of the service. The use information may be collected by receiving use information from a further entity. In an embodiment, an identification of the user equipment initiating use of the service may be collected.

In an embodiment, the network element may process the use information further, for example, by calculating a charge for the use of the service.

The use information may be loaded automatically in a memory of the user equipment. The use information may be loaded at a predetermined interval. The use information may be loaded in response to a predetermined occurrence.

BRIEF DESCRIPTION OF THE DRAWINGS

The invention will now be described in further detail, by way of example only, with reference to the following examples and accompanying drawings, in which.

DETAILED DESCRIPTION OF PREFERRED EMBODIMENTS

Figure 1:
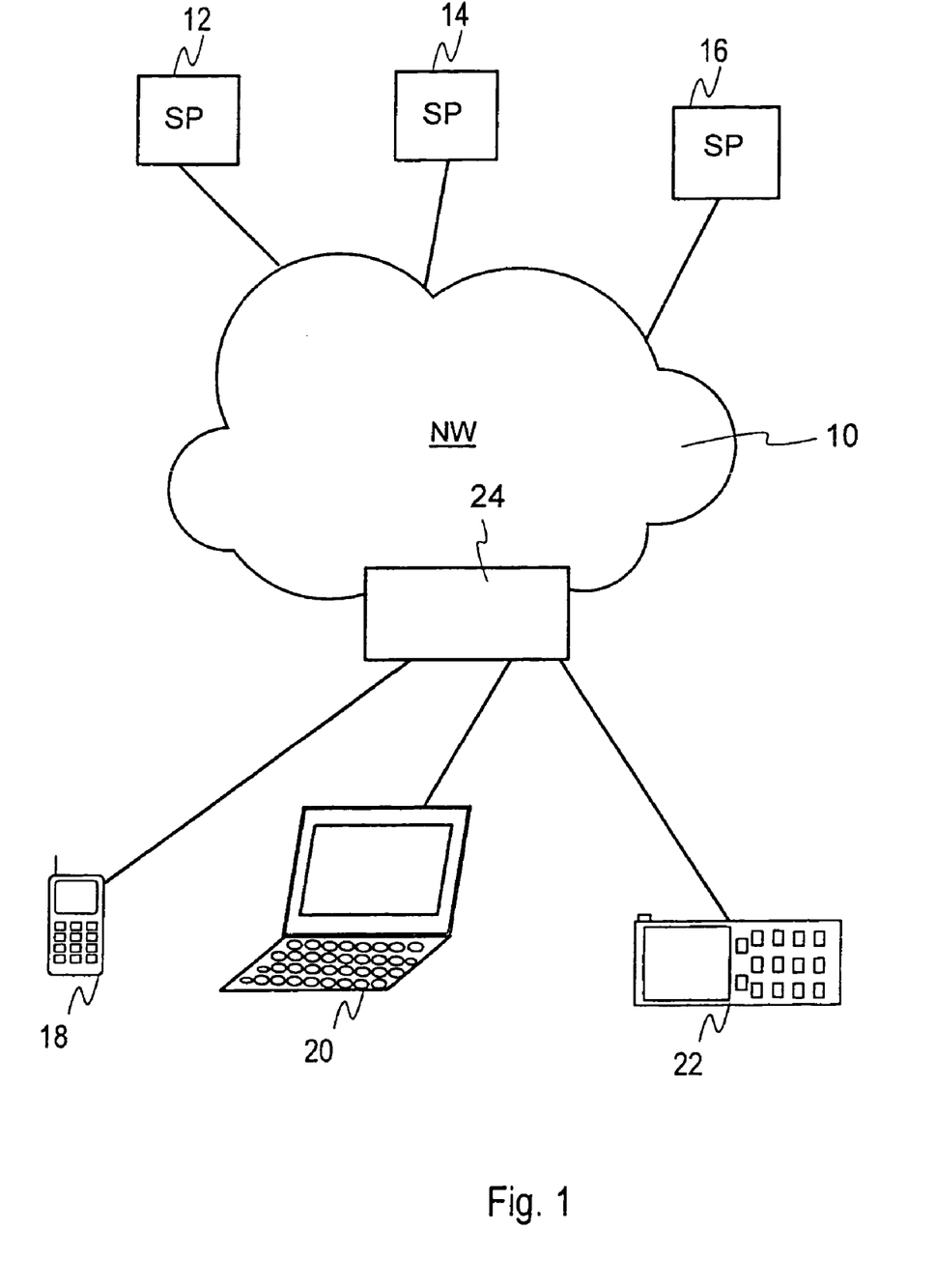
FIG. 1 shows an example of an arrangement in which the embodiments of the invention may be implemented.

FIG. 1 shows an example of an arrangement including a communication network 10, a plurality of service providers (SP) 12, 14 and 16, and a plurality of user equipment 18, 20 and 22. In connection with the present invention, by service provider it is typically meant a system providing information or any other appropriate form of service provisioning that may occur via a communication network, some examples of which are given above. In the present invention, the service provider may be an operator of the communication network or an external service provider, or in other words, a service provider not managed by the operator of the communication network 10. In an embodiment, the service provider may comprise a plurality of servers providing the same service. The servers may locate physically in a single location or in a plurality of locations. The communication network 10 may be any appropriate communication network. In an embodiment, the communication network 10 is provided at least in part by a mobile communication network.

It shall be appreciated that FIG. 1 is only an example showing three external service providers and three user equipment and that the number of these entities may differ substantially from that which is shown. It is also to be noted that a communication network may simultaneously provide services internally and be in contact with external service providers.

An end-user may browse the network and connect the services using an appropriate browser operating according to an appropriate protocol. In a mobile communication network, an example of an appropriate protocol may be the WAP. The communication system may also be provided with some intelligence, examples including, but not limited to, intelligent networks (IN) and a so-called intelligent content delivery (ICD) system in connection with a mobile communication system.

FIG. 1 shows also an information provision entity 24, which may be a separate network element or, for example, comprised in the ICD system. Use of services, including services provided by the operator and services provided by external service providers, may be monitored by the information provision entity 24 or by a separate monitoring network element connected to the information provision entity 24. Operation of the exemplifying information provision entity 24 will become clear from the following description.

Figure 2:
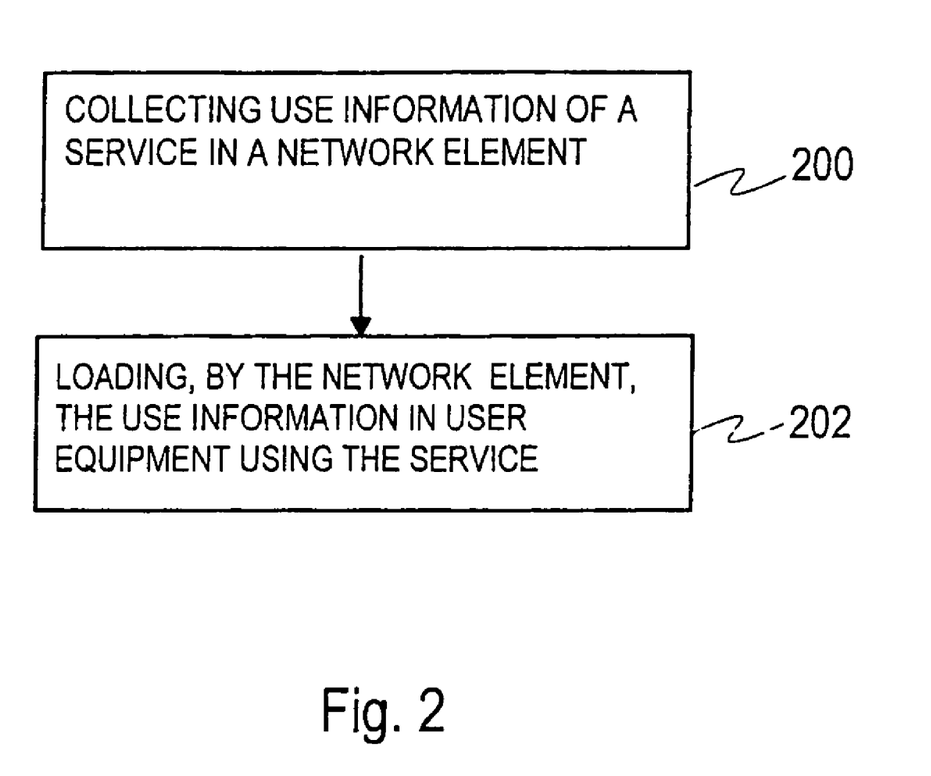
FIG. 2 shows a flow chart illustrating an embodiment of the invention.

FIG. 2 shows a flow chart of a method for providing user equipment information associated with use of services provided via a communication system. In step 200, in a network element, use information is collected relating to use, by the user equipment during a period, of a service provided via the communication system. In step 202, the use information is loaded, by the network element, on the user equipment according to a predetermined plan. The predetermined plan may comprise a predetermined interval at which the use information is loaded on the user equipment. In an alternative, the predetermined plan may define an occurrence initiating the loading.

In an embodiment, the network element may detect the start and the end of the use of the service for collecting the use information. In an embodiment, event records relating to user equipment trying to initiate or initiating use of the service may be collected. For example, it may be recorded whether a password or other login identifier(s) has been used or tried to be used. Embodiments may allow, for example, detecting fraudulent use of user equipment identification, collecting login information and supervising automatic service delivery. In an embodiment, the use information may be received partly or entirely from a further entity, such as a charging system or a service provider, such as a content provider or a bank, and so on. The use information may be processed further in the information provision entity 24.

In an embodiment, the information received from the further entity may be associated with the information collected in the information provision entity 24. The association may be done in the information provision entity, which then loads the associated information on the user equipment.

In an embodiment, the information provision entity 24 may calculate a charge for the use of the service. Calculation may be based, for example, on use information detected by the information provision entity 24, itself. Additionally, the information provision entity 24 may use in calculating further use information received from a further entity, such as a charging system providing information on a prepaid account relating to the subscriber.

The step 202 of loading, shown in FIG. 2, preferably comprises loading the use information automatically in a memory of the user equipment. The information may be loaded on an appropriate location in the memory of the user equipment. The information provision entity 24 may load said use information on the log file of the user equipment so that the subscriber may view the information using an existing log viewer application of the user equipment. In an alternative, a specialized part may be introduced in a management tree of the user equipment. The specialized part may be used to store and provide for displaying said information. A specialized application for showing and viewing the information may be provided in the user equipment.

The information provision entity 24 may use an appropriate terminal management protocol, such as the OMA (Open Mobile Alliance) Device Management, to load said use information on the user equipment. The information may be provided to the user equipment automatically. The information may be loaded on the user equipment in predetermined intervals or loading may be initiated by a predetermined occurrence. Example of predetermined occurrence may include, but is not limited to, the user equipment establishing a new active connection to the network. In an alternative, the user equipment may request for the information. The information may be loaded by means of an appropriate delivery system, such as device management server, electronic server, Web server, MMS center, SMS center or the like.

In an embodiment, use information is sent to user equipment to be displayed automatically on the user equipment when the use of the service ends. For example, a charge indication or other indication relating to the service may be displayed in a form of an information page during a logging out procedure or shortly after the logging out from the service.

The information provision entity 24 may determine the subscribers for which the information is collected, for example all the subscribers having been active during the collection period.

In an embodiment, the information provision entity 24 may detect the start and the end of use of a service automatically when a subscriber possessing a prepaid account is browsing services by means of user equipment. The information provision entity 24 may, for example, detect when a service changes from a first service to a second service and assume that the use of the first service ends at that moment. The service change may be detected, for example, when a URL (Uniform Resource Locator) identifying the service location changes. The information provision entity 24 may provide a pre-note about the credit of the prepaid account of the subscriber before redirecting the browser to a new service.

Figure 3:
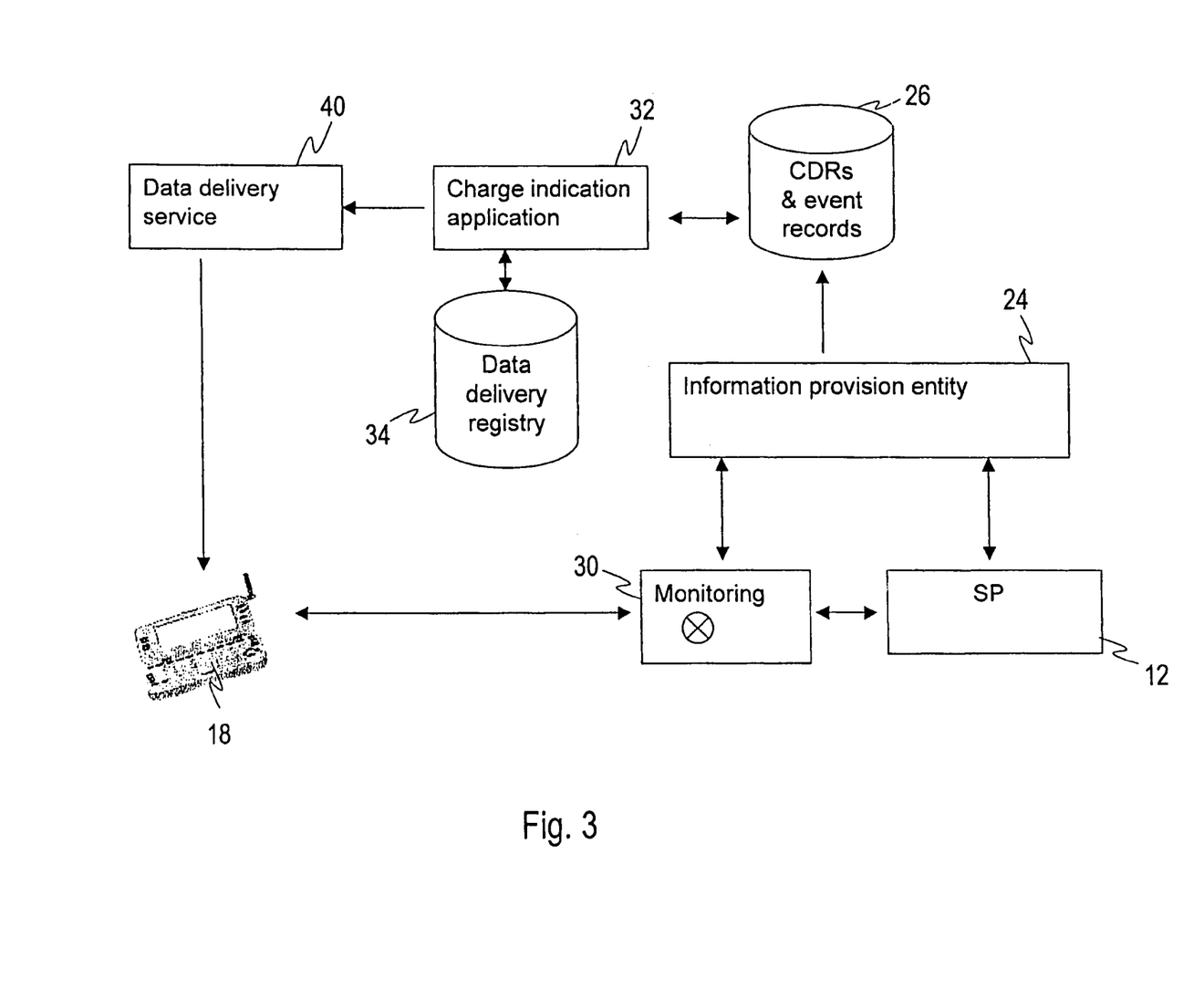
FIG. 3 shows an embodiment of the invention.

FIG. 3 shows an embodiment of the invention for processing charge indication to be loaded in user equipment 18. Use of a service provided by a service provider 12 used by the user equipment 18 is monitored by a monitoring entity 30. Both the monitoring entity 30 and the service provider 12 may provide information to an information provision entity 24, which produces call detail records (CDRs) and event records, which may be stored in a storage entity 26. Appropriate CDRs and event records may be provided with an information providing application, such as a charge indication application 32, which may provide information further to a data delivery service 40 and communicate with a data delivery registry 34. The data delivery registry 34 may store information relating to the data delivery service, such as orders for the data delivery or information providing service and a service history. The data delivery service 40 may load the information in the user equipment, for example, by loading the use information automatically in a memory of the user equipment. The data delivery service might thus be named a notification and data loading service or an information providing service or the like.

Figure 4:
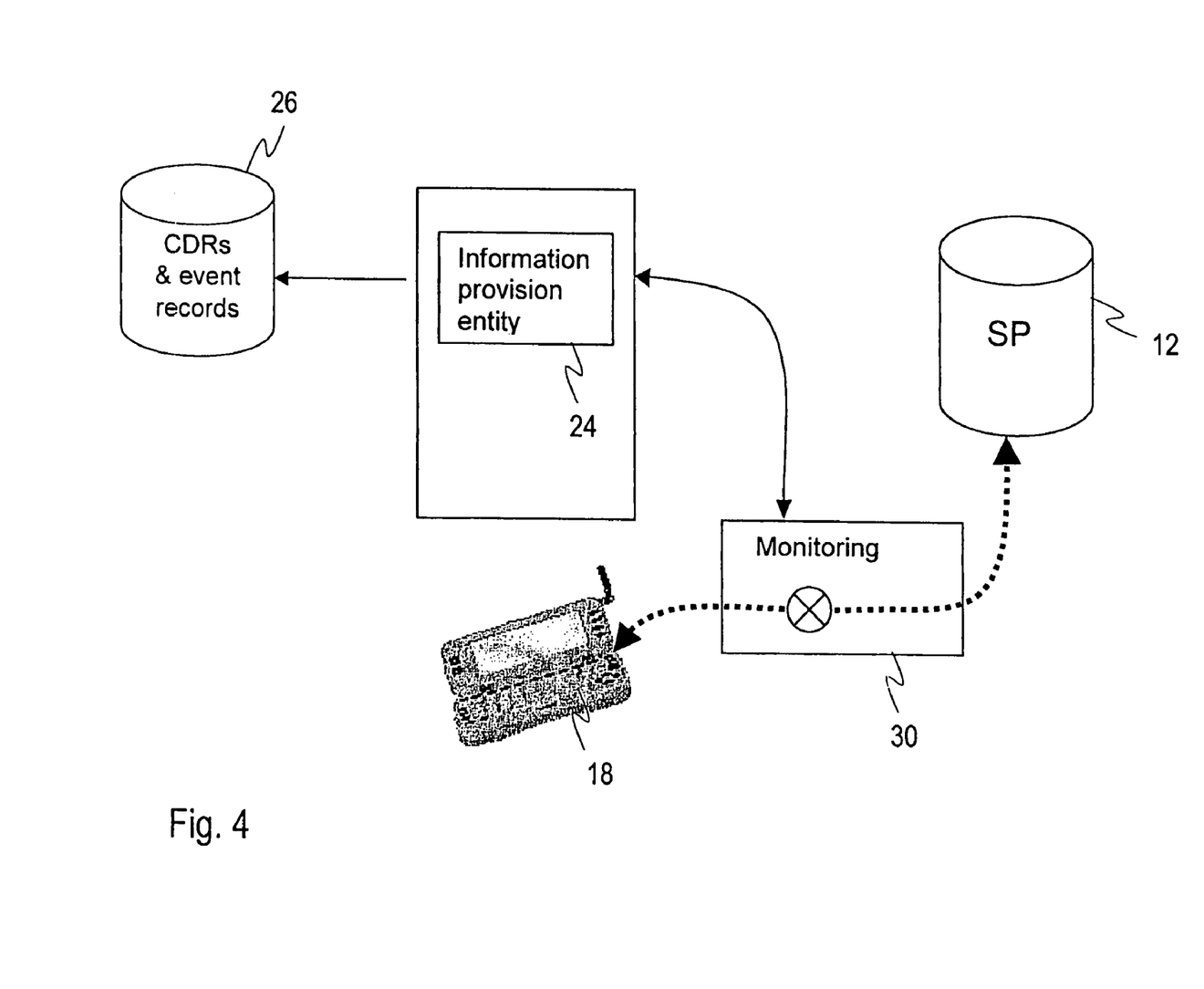
FIG. 4 shows an example of information provisioning according to an embodiment of the invention.

FIG. 4 shows an embodiment for obtaining information for producing the CDRs and event records. The monitoring entity 30 may monitor the use of the service of the service provider 12 and provide information on the use with the information provision entity 24 for producing CDRs and event records 26.

Figure 5:
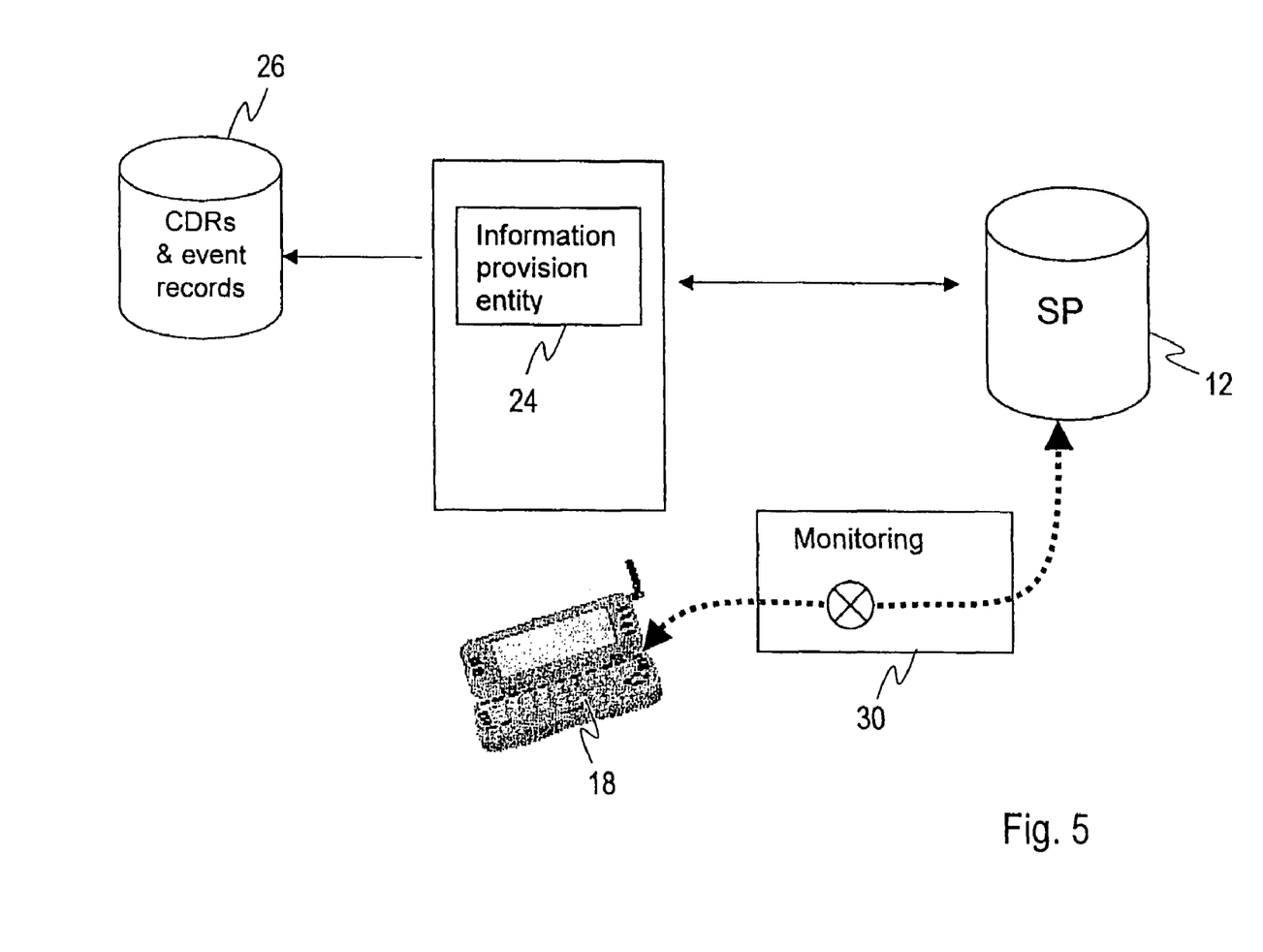
FIG. 5 shows a further example of information provisioning according to an embodiment of the invention.

FIG. 5 shows an alternative embodiment for obtaining information for producing the CDRs and event records. The monitoring entity 30 may monitor the use of the service of the service provider 12 and provide information on the use with the service provider 12. The service provider 12 may provide the information with the information provision entity 24 for producing CDRs and event records 26.

The information page may have an appropriate form. An example may be: "The service you are disconnecting costs you 1,02 euros. You still have 12,39 euros on your prepaid account. You may top up your balance at www.operator.com/topup. Have a nice day." This information page may be shown for a predefined time, such as five seconds, and then a logout page or a logout confirmation page may be shown. The information page may also include information on free use of services. For example, a subscriber may be offered free use of services for a predetermined period when changing an operator. The information page may thus read: "Yesterday you used the network provided by the Operator for 2,47 euros, but the use was totally compensated with our Summer Switch Promotion".

Some of the embodiments of the invention may at least partially be realized in appropriate network elements by means of a computer program. The computer program may comprise program code means for performing steps according to said embodiments when the program is run on a computing means.

The information provision entity 24 may be managed by an operator of the communication system. In an alternative functionalities of the information provision entity 24 are provided by a third party.

Figure 6:
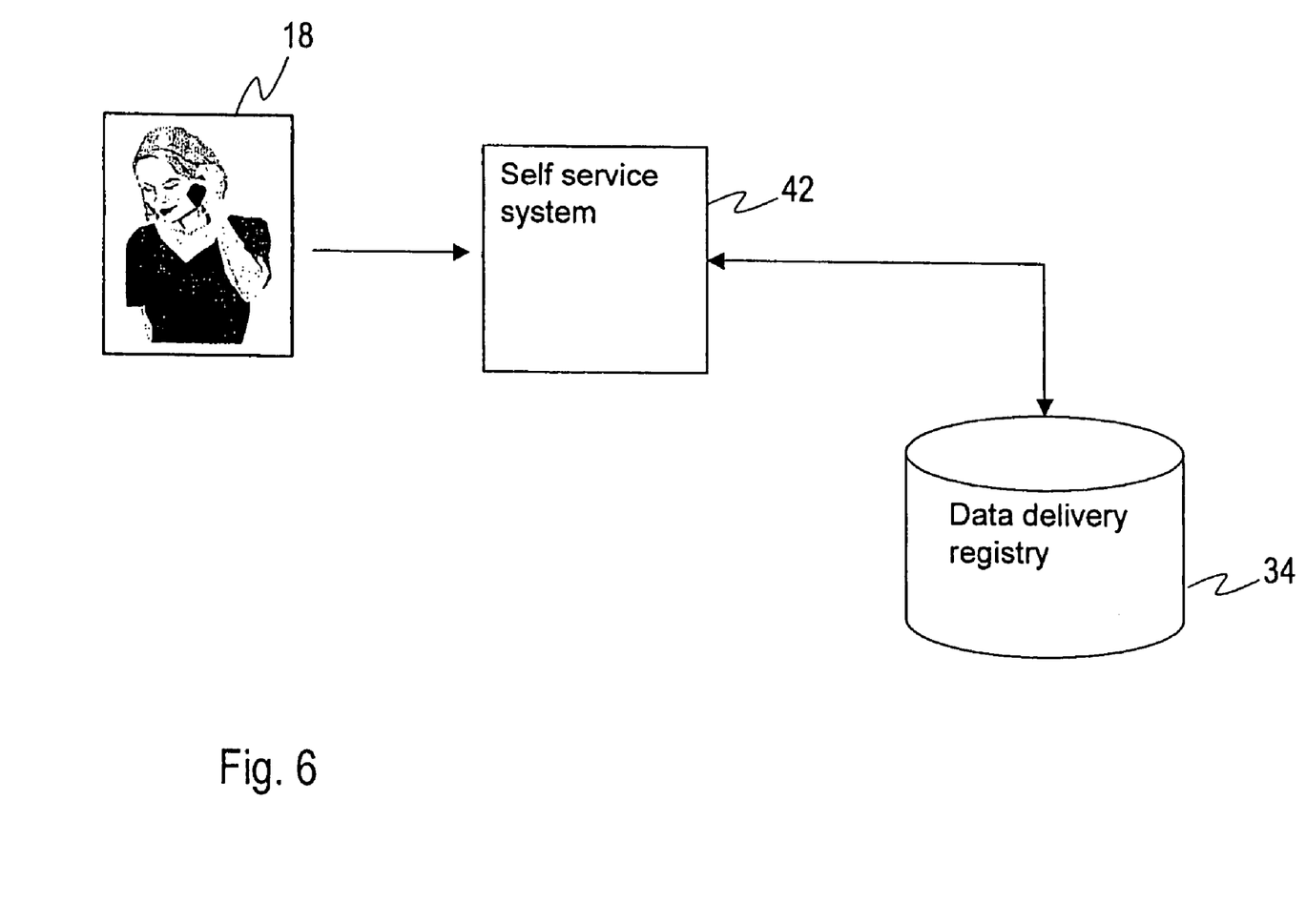
FIG. 6 shows a further embodiment of the invention.

FIG. 6 shows an example of ordering a charge indication service according to an embodiment of the invention. A user using user equipment 18 may order through a self service system 42 or a service desk or another such system the charge indication service or information providing service. The self service system 42 may communicate with the data delivery registry 34. The function of the data delivery registry 34 may be as explained above.

A subscriber may wish to have further types of use information accessible in the user equipment. For example, using a service may create fidelity bonus. Another example may include paying invoices from a bank account via a communication system by means of user equipment. Such information may be loaded on the user equipment in accordance with the invention, as well.

Although the invention has been described in the context of particular embodiments, various modifications are possible without departing from the scope and spirit of the invention as defined by the appended claims. It should be appreciated that whilst embodiments of the present invention have been described in relation to mobile user equipment such as mobile terminals, embodiments of the present invention may be applicable to any other type of user equipment that may access services provided via communication networks. Furthermore, the communication system may be any appropriate communication system, even if reference has mainly been made to mobile communication systems.

The invention claimed is:

1. A method, comprising:
    facilitating collecting, in a network element, of use information relating to use, by user equipment during a period, of a service provided via a communication system; and
    facilitating loading, by the network element, of the use information onto the user equipment according to a predetermined plan, wherein
    the predetermined plan comprises the network element either loading the use information onto the user equipment responsive to the network element recognizing an end of use of the service by observing a resource identifier or loading the use information onto the user equipment according to a predetermined interval,
    the loading comprises loading the use information automatically in a memory of the user equipment, and
    the loading comprises loading the use information in response to a predetermined occurrence.

2. A method according to claim 1, wherein the collecting comprises detecting, by the network element, a start and an end of a use of the service by the user equipment.

3. A method according to claim 1, wherein the collecting comprises receiving use information from a further entity.

4. A method according to claim 1, wherein the collecting comprises collecting an identification of the user equipment initiating use of the service.

5. A method according to claim 1, further comprising processing the use information.

6. A method according to claim 5, wherein the processing comprises calculating a charge for the use of the service.

7. A method according to claim 1, wherein the resource identifier is a universal resource locator.

8. A computer program embodied on a computer readable medium comprising code configured to control a processor to perform a process, the process comprising:
    facilitating collecting, in a network element, of use information relating to use, by user equipment during a period, of a service provided via a communication system; and
    facilitating loading, by the network element, of the use information onto the user equipment according to a predetermined plan, wherein the predetermined plan comprises either loading the use information onto the user equipment responsive to the network element recognizing an end of use of the service by observing a resource identifier or the network element loading the use information onto the user equipment according to a predetermined interval, the loading comprises loading the use information automatically in a memory of the user equipment, and the loading comprises loading the use information in response to a predetermined occurrence.

9. A computer program according to claim 8, wherein the collecting comprises detecting, by the network element, a start and an end of a use of the service by the user equipment.

10. A computer program according to claim 8, wherein the collecting comprises receiving use information from a further entity.

11. A computer program according to claim 8, wherein the collecting comprises collecting an identification of the user equipment initiating use of the service.

12. A computer program according to claim 8, the process further comprising:
processing the use information.

13. A computer program according to claim 12, wherein the processing comprises calculating a charge for the use of the service.

14. A computer program according to claim 8, wherein the resource identifier is a universal resource locator.

15. An apparatus comprising at least one processor and at least one memory including computer program code, the at least one memory and the computer program code configured to, with the at least one processor, cause the apparatus at least to:

facilitate collection of use information for a predefined period relating to use, by user equipment, of a service provided via a communication system, and facilitate loading of the use information onto the user equipment according to a predetermined plan, wherein the predetermined plan comprises either loading the use information onto the user equipment responsive to the apparatus recognizing an end of use of the service by observing a resource identifier or loading the use information onto the user equipment according to a predetermined interval, and the apparatus being further caused to facilitate the loading of the use information automatically in a memory of the user equipment and in response to a predetermined occurrence.

16. An apparatus according to claim 15, wherein the apparatus is further caused to detect the start and the end of the use of the service by the user equipment.

17. An apparatus according to claim 15, further comprising:
a receiver configured to receive use information from a further entity.

18. An apparatus according to claim 15, wherein the apparatus is further caused to facilitate collection of an identification of the user equipment initiating use of the service.

19. An apparatus according to claim 15, wherein the apparatus is further caused to process the use information.

20. An apparatus according to claim 19, wherein the apparatus is further caused to calculate a charge for the use of the service.

21. An apparatus according to claim 15, wherein the resource identifier is a universal resource locator.

22. An apparatus, comprising:
means for facilitating collecting of use information for a predefined period relating to use, by user equipment, of a service provided via a communication system; and means for facilitating loading of the use information onto the user equipment according to a predetermined plan, wherein the predetermined plan comprises either loading the use information onto the user equipment responsive to the apparatus recognizing an end of use of the service by observing a resource identifier or loading the use information onto the user equipment according to a predetermined interval, and the means for facilitating the loading is further configured to facilitate the loading of the use information automatically in a memory of the user equipment and in response to a predetermined occurrence.

23. A system, comprising:
an information provision entity, wherein
the information provision entity is configured to provide a service to user equipment via the system, collect use information relating to use of the service by the user equipment during a period, and load the use information onto the user equipment according to a predetermined plan, and the predetermined plan comprises either loading the use information onto the user equipment responsive to the information provision entity recognizing an end of use of the service by observing a resource identifier or the information provision entity loading the use information onto the user equipment according to a predetermined interval, and the information provision entity is further configured to load the use information automatically in a memory of the user equipment and to load the use information in response to a predetermined occurrence.

24. A system, comprising:
providing means for providing a service to user equipment via the system;

collecting means for collecting use information relating to use of the service by the user equipment during a period; and loading means for loading the use information onto the user equipment according to a predetermined plan, wherein the predetermined plan comprises either loading the use information onto the user equipment responsive to the system recognizing an end of use of the service by observing a resource identifier or the system loading the use information onto the user equipment according to a predetermined interval, and the loading means is further configured to load the use information automatically in a memory of the user equipment and to load the use information in response to a predetermined occurrence.

* * * * *